US005456593A

United States Patent [19]

Kleyn

[11] Patent Number: 5,456,593
[45] Date of Patent: * Oct. 10, 1995

[54] MOLDING APPARATUS FOR ARTICLES HAVING INTERNAL UNDERCUTS

[75] Inventor: Hendrik Kleyn, Grandville, Mich.

[73] Assignee: Kleyn Die Engravers, Inc., Jenison, Mich.

[*] Notice: The portion of the term of this patent subsequent to Nov. 29, 2011 has been disclaimed.

[21] Appl. No.: 95,069

[22] Filed: Jul. 21, 1993

Related U.S. Application Data

[63] Continuation of Ser. No. 957,526, Oct. 6, 1992, Pat. No. 5,368,467.

[51] Int. Cl.$^6$ ..................................... B29C 45/44
[52] U.S. Cl. .................... 425/556; 425/577; 425/443; 425/444; 425/DIG. 58; 249/60; 249/64; 249/178
[58] Field of Search .................... 425/577, 556, 425/444, 443, DIG. 58, 441; 249/63, 64, 67, 176, 178, 180, 184

[56] References Cited

U.S. PATENT DOCUMENTS

| | | |
|---|---|---|
| 3,060,509 | 10/1962 | McCubbins, Jr. . |
| 3,197,825 | 8/1965 | Hammond . |
| 3,341,897 | 9/1967 | Susuki et al. . |
| 3,381,068 | 4/1968 | Leiper et al. . |
| 3,642,417 | 2/1972 | Von Holdt . |
| 3,649,728 | 3/1972 | Honsho et al. . |
| 3,669,598 | 6/1972 | Tucker . |
| 3,687,591 | 8/1972 | Perego . |
| 3,798,299 | 3/1974 | Gumm et al. . |
| 3,816,047 | 6/1974 | Mohler . |
| 4,101,256 | 7/1978 | White et al. ..................... 425/DIG. 58 |
| 4,104,606 | 4/1978 | Donoghue . |
| 4,278,417 | 7/1981 | Wilds et al. . |
| 4,342,549 | 8/1982 | Lemelson . |
| 4,353,522 | 10/1982 | Anger ............................... 425/DIG. 58 |
| 4,383,670 | 5/1983 | Olschewski et al. ............ 425/DIG. 58 |
| 4,452,420 | 6/1984 | Lundquist . |
| 4,576,568 | 3/1986 | Grannen, III . |
| 4,729,863 | 3/1988 | Muller et al. . |
| 4,820,149 | 4/1989 | Hatakeyama et al. . |
| 4,832,307 | 5/1989 | Watanabe et al. ..................... 249/184 |
| 4,861,257 | 8/1989 | Siotani ..................................... 249/180 |

(List continued on next page.)

FOREIGN PATENT DOCUMENTS

| | | |
|---|---|---|
| 1178357 | 5/1959 | France . |
| 1406950 | 9/1964 | France ........................... 425/DIG. 58 |
| 2086945 | 12/1971 | France . |
| 57-148867 | 12/1982 | Japan . |
| 61-197217 | 1/1987 | Japan . |
| 1-024709 | 5/1989 | Japan . |
| 1249945 | 10/1991 | United Kingdom ........... 425/DIG. 58 |

OTHER PUBLICATIONS

D & L Progressive Components, UniLifter brochure (date unknown).
PCS Company, E-Z Lifter brochure (date unknown).

*Primary Examiner*—Khanh P. Nguyen
*Attorney, Agent, or Firm*—Warner Norcross & Judd

[57] ABSTRACT

An injection molding apparatus is disclosed for forming articles with internal undercuts by the use of lifter heads with transversely extending protrusions. The lifter heads are received in recesses in the mold projections which form the interior of the molded article. The transverse protrusions of the lifter heads extend into the voids surrounding the projections to form the undercuts. The lifter heads are extended outwardly from the projections to remove the article from the mold. Ejector pins move the molded article outwardly from the lifter heads. The lifter head protrusions have inward ramping surfaces which facilitate the removal of the molded article. A lifter head may include two, angularly offset protrusions which form two undercuts near the corner between intersecting internal walls of the molded article. The protrusions have beveled release surfaces which allow the molded article to shift transversely off the lifter heads.

20 Claims, 5 Drawing Sheets

U.S. PATENT DOCUMENTS

| | | | |
|---|---|---|---|
| 4,872,637 | 10/1989 | Vankens | 425/DIG. 58 |
| 4,986,942 | 1/1991 | Irgens . | |
| 4,997,356 | 3/1991 | Katagiri . | |
| 4,998,874 | 3/1991 | Stocchiero . | |
| 5,137,442 | 8/1992 | Starkey . | |
| 5,281,127 | 1/1994 | Ramsey | 425/556 |
| 5,368,467 | 11/1994 | Kleyn | 425/556 |

MOLDING APPARATUS FOR ARTICLES HAVING INTERNAL UNDERCUTS

RELATED APPLICATION

This application is a continuation of U.S. application Ser. No. 07/957,526 filed Oct. 6, 1992 which issued as U.S. Pat. No. 5,368,467, Nov. 29, 1994.

BACKGROUND OF THE INVENTION

1. Field of the Invention

The present invention relates to a molding apparatus for use in plastic injection molding and, more particularly, to a molding apparatus which produces molded plastic articles having internal undercuts.

2. Description of the Related Art

Figure 1:
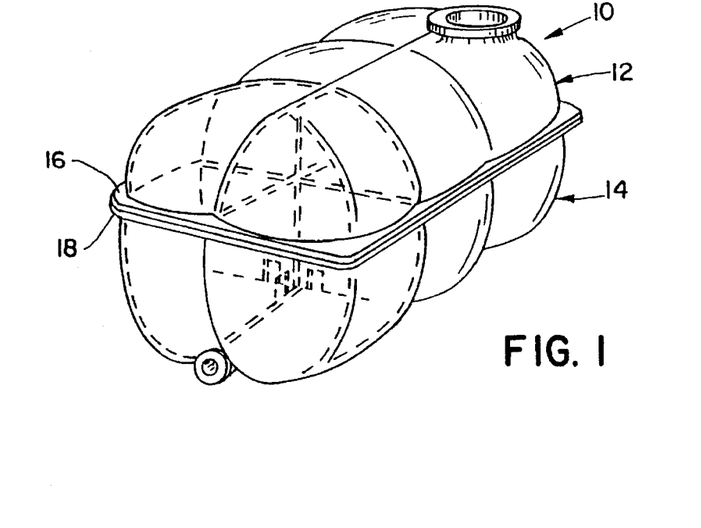
FIG. 1 is a perspective view of an injected molded plastic tank assembly of tank halves, the lower tank half having internal walls and undercut openings made with the molding apparatus of the invention.
Figures 2, 9:
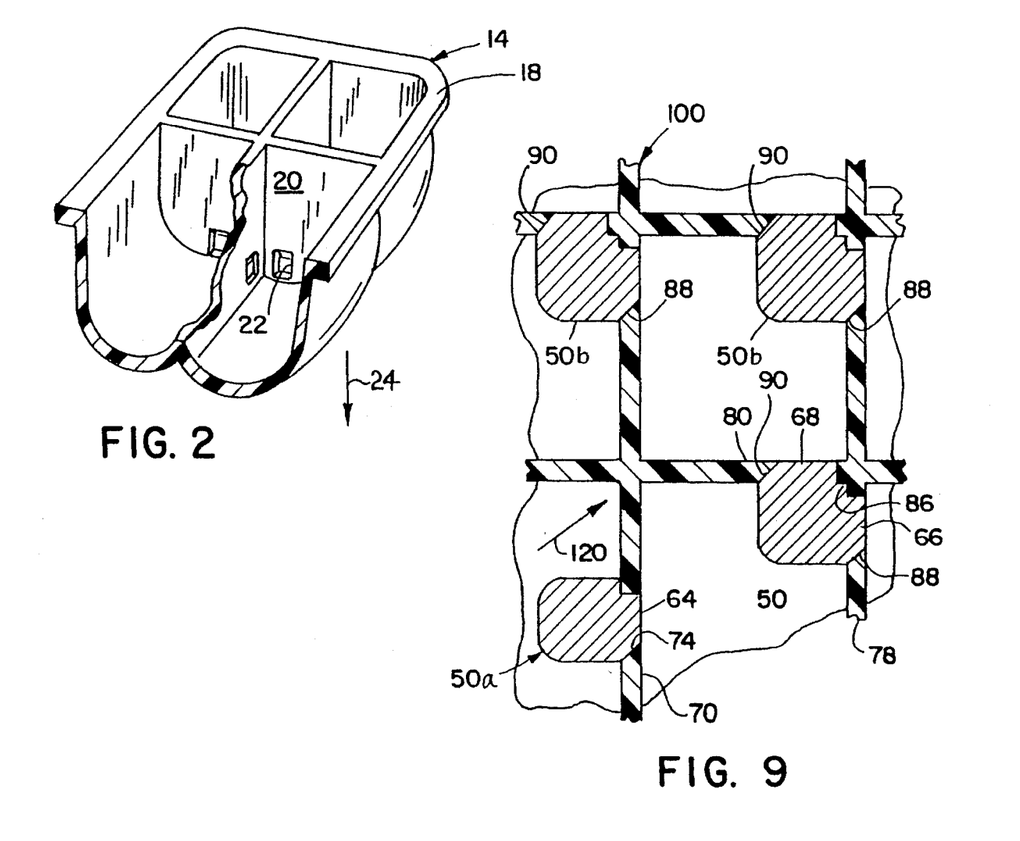
FIG. 2 is a perspective, fragmentary view of the lower tank half of FIG. 1.
FIG. 9 is a fragmentary, plan, sectional view of a molded article on the lifter heads of a molding apparatus according to the invention.

Many articles may be economically constructed of injection molded plastic. A problem exists, however, when the article has undercuts which would prevent the article from being removed from the mold. One such article is shown in FIGS. 1 and 2. A molded plastic tank 10 for containing liquid is made of injection molded plastic top and bottom halves 12, 14 joined by flanges 16, 18 around the center of the tank. As best shown in FIG. 2, the tank halves are formed with internal walls, such as wall 20, which are provided to strengthen and rigidify the tank and to lessen liquid sloshing. In order to allow the liquid to flow through the internal walls, the walls are formed with openings such as opening 22. These openings are undercut, meaning that the axis through an opening extends transversely to the direction, represented by arrow 24, in which the article would be removed from the male die of an injection mold.

When the tank half 14 is formed in an injection mold, the undercut openings are formed by protrusions of the mold extending into the voids of the male mold which form the internal walls. Once the injected plastic has hardened, the tank half is locked into the male mold by the interengagement between the protrusions and the openings. The tank half cannot be removed from the mold unless the protrusions are disengaged from the openings.

In the past, molds have been provided with movable pins or rods which extend through the mold obliquely or perpendicularly to the direction in which the article is removed from the mold. The ends of the pins or rods protrude into the mold voids to form the undercuts. The pins or rods are withdrawn obliquely or transversely to release the molded article. This approach is not suitable, however, when a large number of undercuts are required. FIG. 2 shows three undercuts adjacent to a single wall intersection. It may be desired to mold a much larger tank with a great many wall intersections and undercut openings. In such a situation, it would be extremely expensive and difficult, if not impossible, to construct a mold having enough oblique or transverse pins to form all the required undercuts.

SUMMARY OF THE INVENTION

The present invention provides a plastic injection molding apparatus by which complex articles having a large number of undercuts may be produced. According to the invention, the male mold is constructed with lifter heads which fit into lifter head recesses formed in the mold projections. The lifter heads are extendable outwardly from, and retractable within, the mold projections in the same outward direction in which the molded article is removed from the male mold. The lifter heads have protrusions which extend transversely into the voids of the mold. The protrusions of the lifter heads form the undercuts in the portions of the molded article, such as internal walls, which are formed in the mold voids. The edges of the protrusions directed inwardly are beveled so as to form ramping surfaces.

Further according to the invention, the mold is constructed with ejector pins which are extendable from, and retractable within the male mold in the same direction as the lifter heads. The ejector pins are situated to push outwardly against the molded article and urge the article off the mold and off the lifter heads.

To mold an article, the lifter heads are withdrawn into the lifter head recesses of the male mold projections. With the female mold closed against the male mold, molten plastic is injected with the protrusions of the lifter heads forming the undercuts in the molded article. When the plastic has hardened sufficiently, the female mold is moved away from the male mold. Then, the lifter heads and the ejector pins are extended outwardly to push the molded article off the projections of the male mold. At this point, the lifter heads stop extending, while the ejector pins continue to extend. The ejector pins push the molded article off the lifter heads. The inward ramping surfaces of the lifter head protrusions facilitate the disengagement of the molded article from the lifter heads at the undercuts.

According to a feature of the invention, a single lifter head may be formed with either one or two protrusions to form one or two undercuts. In the latter case, the two protrusions extend in transverse directions angularly offset to one another. For example, in order to form undercuts near the corner at the intersection of perpendicular internal walls of the molded article, the protrusions of the lifter head extend perpendicularly to one another. The edges of the lifter head protrusions disposed opposite the corner are sloped, or beveled, in a common direction toward the corner so as to form transverse release surfaces. When the molded article is removed from the lifter heads by the extension of the ejector pins, the release surfaces allow the molded article to shift transversely off of the lifter heads.

These and other objects, advantages, and features of the present invention will be more fully understood and appreciated by reference to the written specification and appended drawings.

DESCRIPTION OF THE PREFERRED EMBODIMENT

Figure 3:
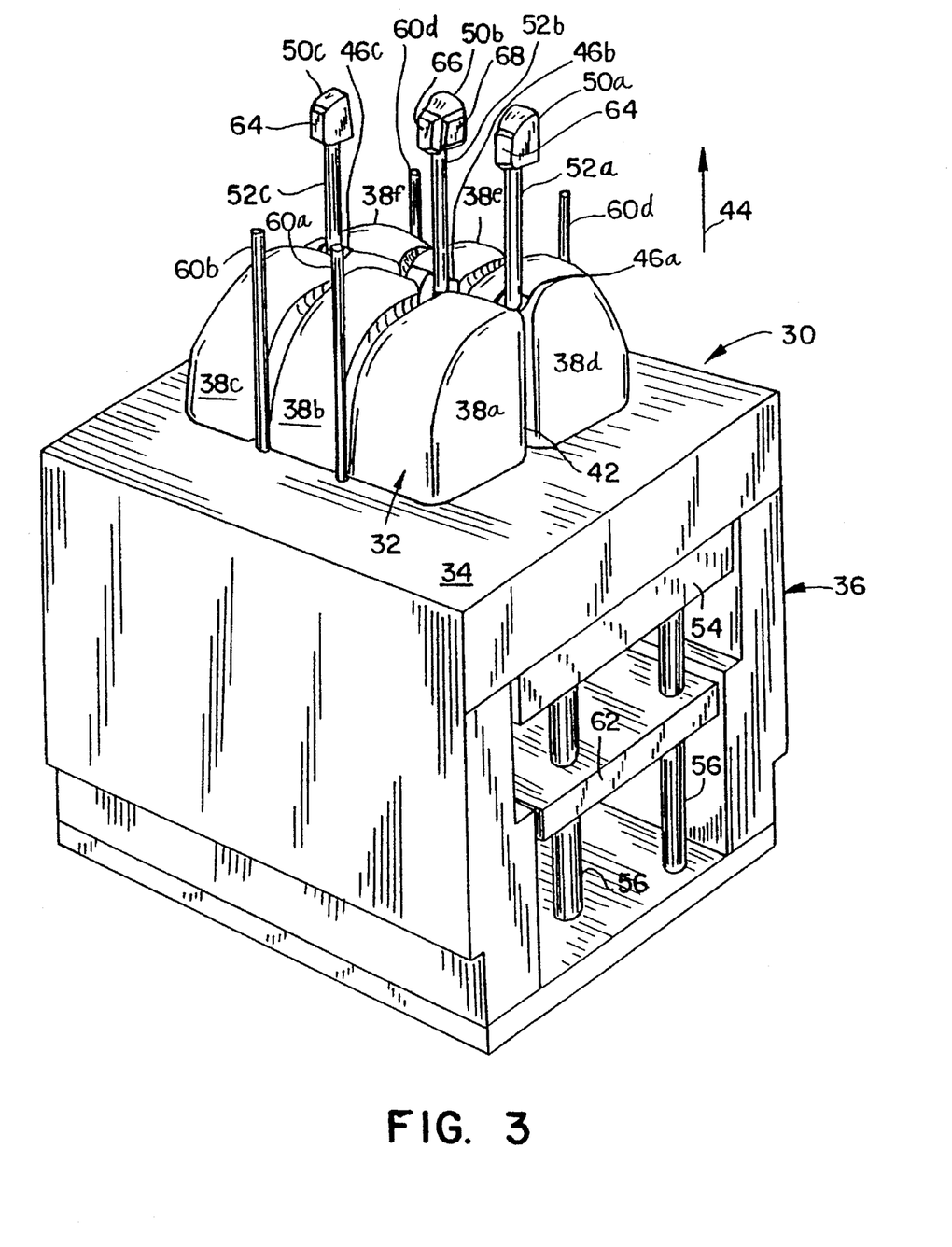
FIG. 3 is a perspective view of a male mold and mold base according to the molding apparatus of the invention.

By way of disclosing a preferred embodiment, and not by way of limitation, there is shown in FIG. 3 a molding apparatus 30 having a male mold 32 affixed to the outwardly directed surface 34 of a mold base 36. The male mold includes several spaced projections 38a–38f which form the open cells, such as cell 40 (FIG. 2), of a tank half 14 to be formed on the mold. Between adjacent pairs of the projections there are formed voids, such as void 42, in which the internal walls, such as wall 20 (FIG. 2), of the tank half are formed.

It should be understood that the molding apparatus is shown in various configurations in FIGS. 3 and 6–9, and that these configurations do not necessarily conform to the shape of the tank half shown in FIG. 2. These various configurations are included to disclose the constructional and operational features of the invention as will be apparent from the following description. The tank shown in FIGS. 1 and 2 is configured with six interior cells in a two by three arrangement. The molding apparatus of the invention may be configured to produce articles having any number or arrangement of cells. All that is required is that the molded article have one or more undercuts disposed transversely to the direction in which the article is removed from the mold.

The projections 38a–38f extend outwardly from the mold generally in the same direction in which the molded articles will be removed from the mold as indicated by arrow 44. The direction denoted by arrow 44 is referred to herein as "outward" and is intended to refer to the direction in which the molded article moves substantially away from the male mold after molding is complete. In the embodiment of FIG. 3, this direction is substantially perpendicular to the mold face 34. However other directions are within the scope of the invention. Where the molded article is to be formed with undercuts, the projections are formed with lifter head recesses, such as recesses 46a–46c in projections 38d–38f, respectively.

Lifter heads 50a–50c are shown in their fully extended position. When retracted, the lifter heads are received within the corresponding recesses 46a–46c. The lifter heads are affixed to the outer ends of lifter rods 52a–52c. The lifter rods extend through the recesses 46a–46 and through holes formed through the mold base 36. The inner ends of the lifter rods 52a–52c are affixed to a lifter plate 54 which is mounted on guide rods 56 for outward movement to extend the lifter heads, and for inward movement to retract the lifter heads into the recesses 46a–46c.

Ejector pins 60a–60d are shown in their partially extended position. When retracted, the outer ends of the ejector pins lie flush with the mold face 34. The ejector pins are positioned adjacent the projections such that their outer ends contact a surface of the molded article such as the flange 18 of the tank half shown in FIG. 2. The ejector pins extend through holes formed through the mold base 36 and through holes formed through the lifter plate 54. The inner ends of the ejector pins are affixed to ejector plate 62 which is mounted on guide rods 56 for outward movement to extend the ejector pins, and for inward movement to retract the ejector pins.

Lifter heads 50a and 50c have single protrusions 64 which form a single undercut opening in an internal wall of the molded article. Corner lifter head 50b has two protrusions 66, 68 which form the undercut openings in each of two intersecting internal walls of the molded article adjacent the corner formed at the intersection.

Figure 4:
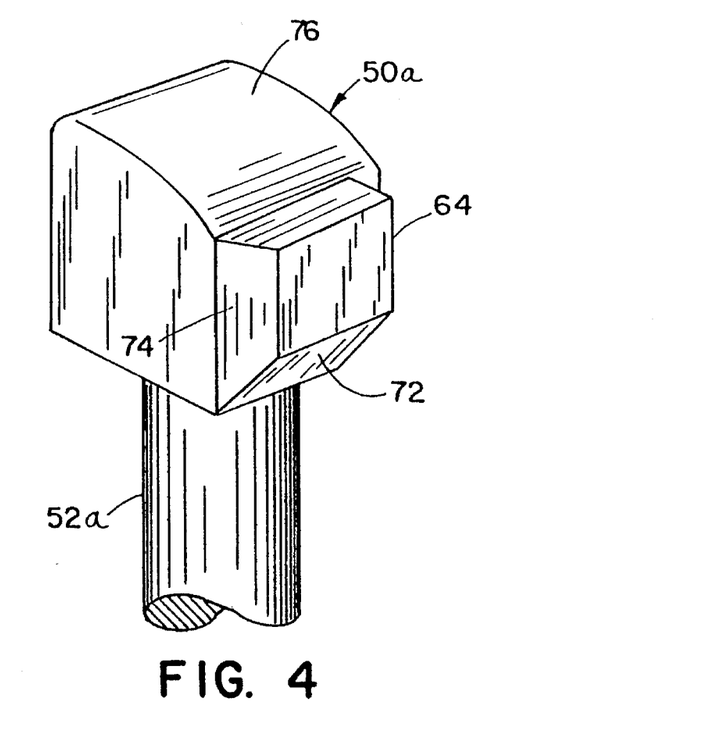
FIG. 4 is an enlarged, perspective, fragmentary view of a lifter head having a single protrusion.
Figure 8:
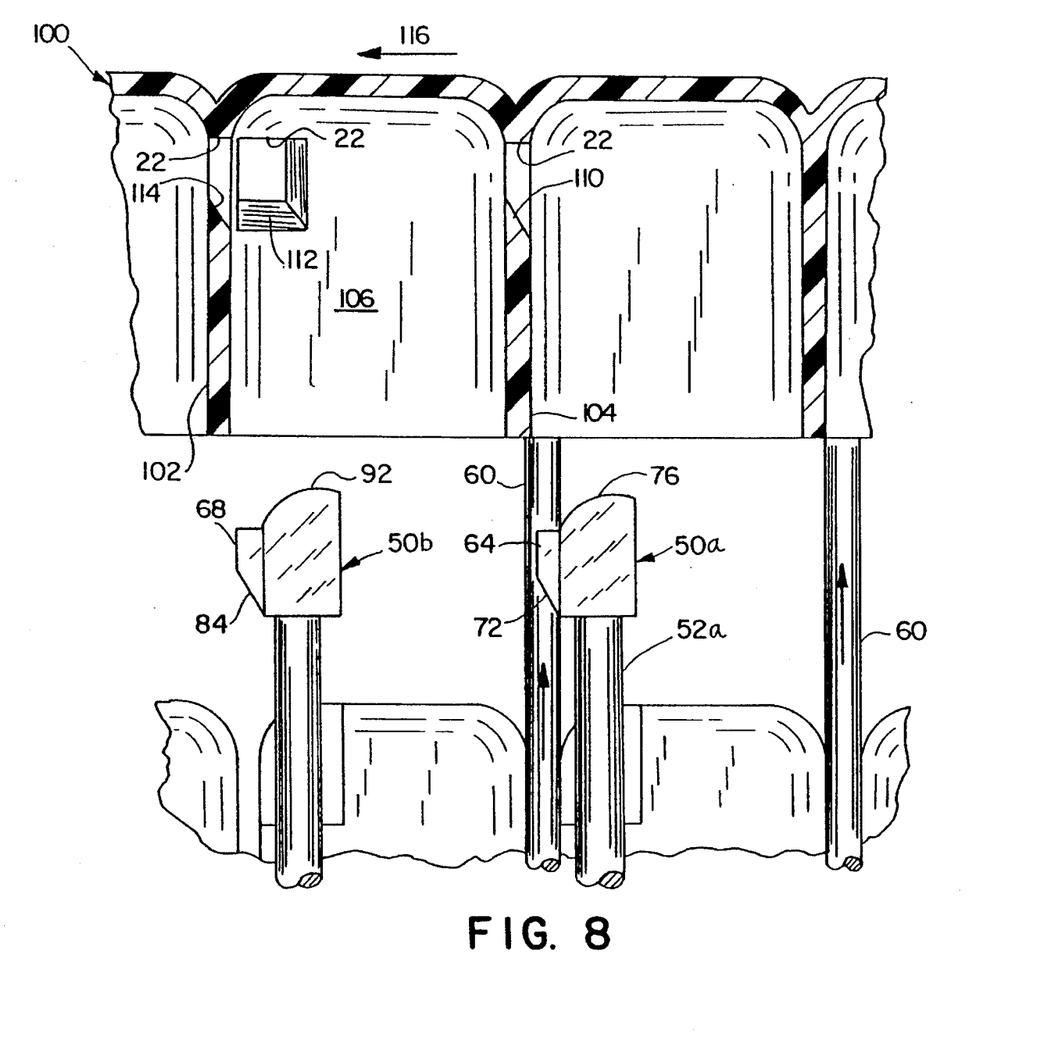
FIG. 8 is similar to FIG. 7 but showing the ejector pins fully extended.

The details of a single protrusion lifter head 50a are shown in FIGS. 4, 8 and 9. The lifter head is enlarged with respect to the lifter rod 52a to which it is affixed. The lifter head is generally four-sided, with protrusion 64 extending transversely into the void of the male mold in which wall 70 of the molded article shown in FIG. 9 is formed. The inwardly directed edge of the protrusion is beveled so as to provide an inward ramping surface 72. Another edge of the protrusion extending generally parallel to the outward direction is beveled so as to provide a sloping, transverse release surface 74. The outer surface 76 of the lifter head is shaped to match the contours of the mold projection into which the lifter head is recessed when retracted.

Figure 5:
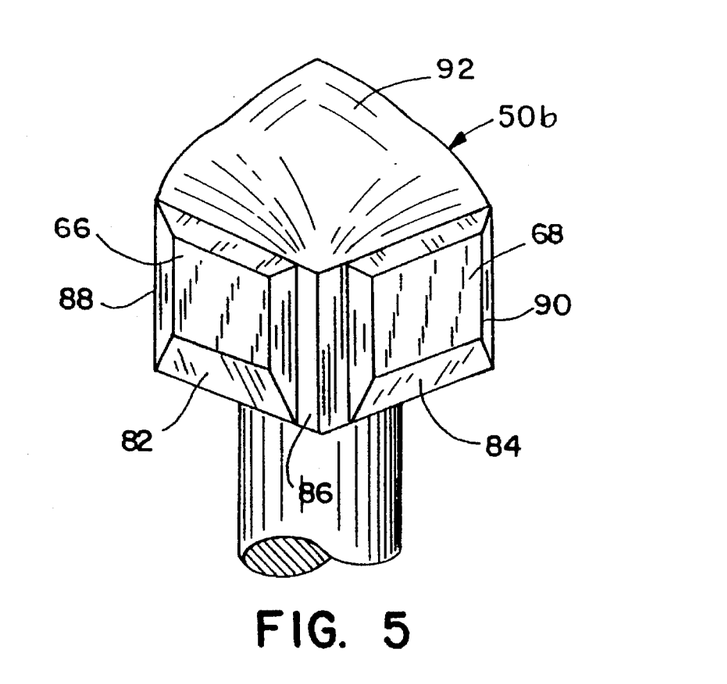
FIG. 5 is an enlarged, perspective, fragmentary view of a corner lifter head having two protrusions.

The details of a double protrusion, or corner, lifter head 50b are shown in FIGS. 5, 8 and 9. This lifter head is also generally four sided, with protrusions 66, 68 extending transversely from adjacent sides into the voids of the male mold in which intersecting walls 78 and 80 is formed. The inwardly directed edge of both protrusions is beveled so as to provide inward ramping surfaces 82, 84. The edges of the protrusions 66, 68 opposite the corner 86 at which the walls 78 and 80 intersect, which edges extend generally parallel to the outward direction, are beveled so as to provide transverse release surfaces 88, 90 which slope toward the corner 86. The outer surface 92 is shaped to match the contours of the mold projection into which the lifter head is recessed when retracted.

Figure 6:
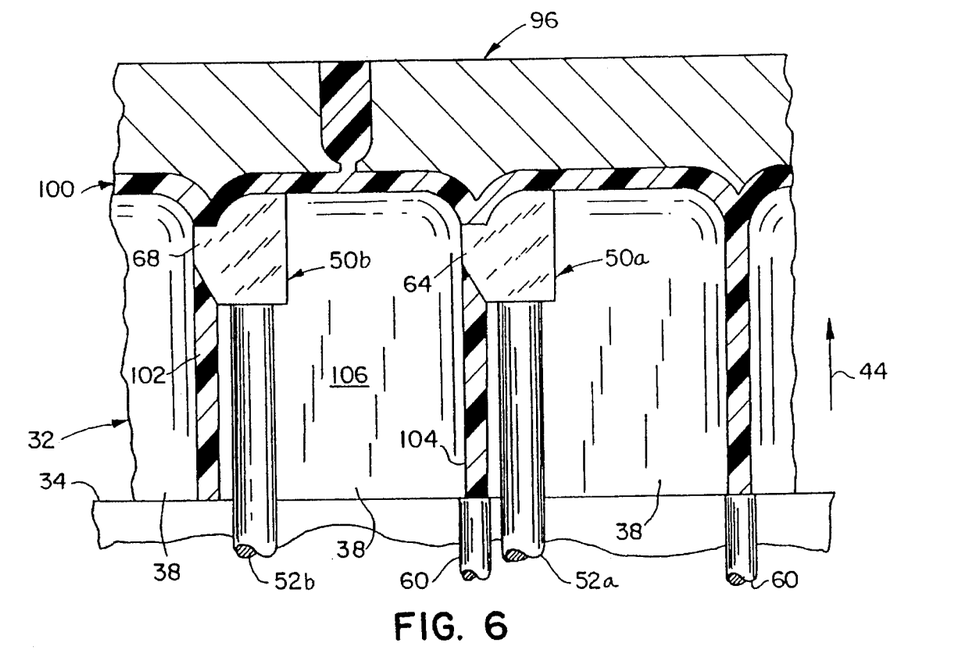
FIG. 6 is a fragmentary, elevational, sectional view of a molding apparatus according to the invention taken along a line adjacent the lifter heads with the lifter heads and ejector pins retracted.
Figure 7:
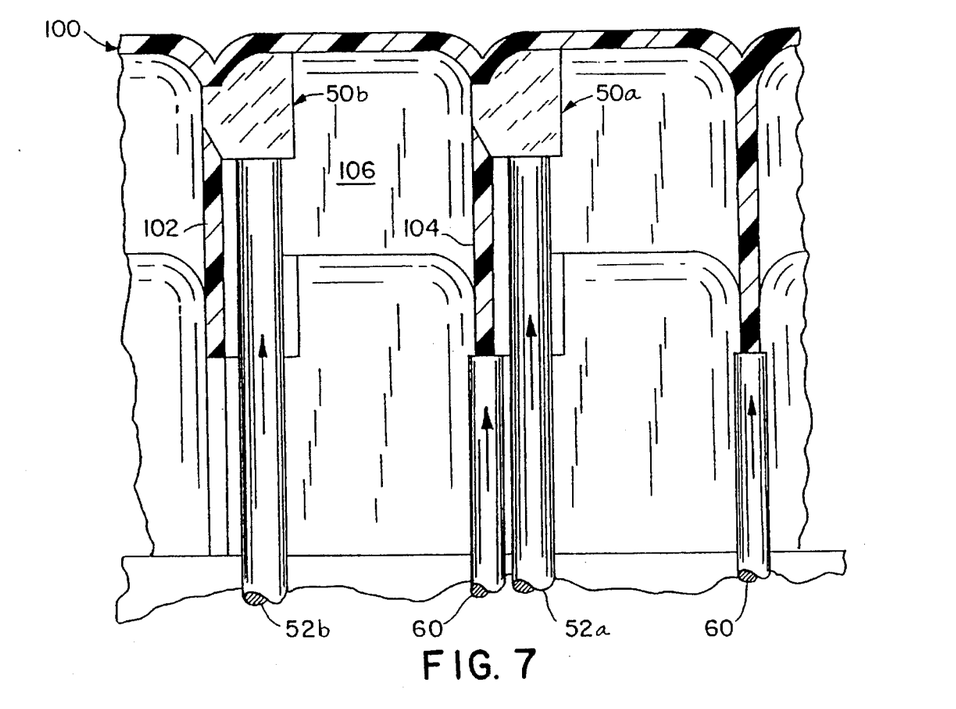
FIG. 7 is similar to FIG. 6 but showing the lifter heads fully extended and the ejector pins partially extended.

The operation of the mold is illustrated in FIGS. 6–8. As shown in FIG. 6, a molding cycle begins with the lifter heads and lifter rods, such as lifter heads 50a and 50b, retracted into the recesses of the projections 38 of the male mold 32. Ejector pins 60 are retracted so that their outer ends are flush with the mold base outer surface 34. Female mold 96 is closed in cooperation with the male mold so as to define the void in which the molded article will be formed.

Molten plastic is then injected into the void to form the article such as tank half 100. The tank half is formed with internal walls such as walls 102, 104, and 106 formed in the voids between the projections. The direction of article removal 44 is determined by the orientation of the walls. Protrusion 64 of lifter head 50a extends transversely to the removal direction 44 into wall 104. Protrusion 68 of corner lifter head 50b extends transversely into wall 102. The second protrusion (not shown) of corner lifter head 50b extends transversely into wall 106.

Referring now to FIG. 7, when the plastic has hardened sufficiently, a suitable driving apparatus moves lifter plate 54 and ejector plate 62 (FIG. 3) outwardly by equal distances and at equal rates. The movement of the plates causes the lifter rods 52a, 52b and ejector pins 60 to extend outwardly from the mold. The lifter heads 50a, 50b and ejector pins 60 push the tank half 100 outwardly off the mold projections. The movement is stopped when the walls 102, 104 and 106 are clear of the mold projections.

When the lifter plate 54 reaches the limit of its outward movement, the ejector plate continues to move outwardly. As shown in FIG. 8, the ejector pins extend to push the tank half outward off the lifter heads 50a, 50b.

The movement of the molded article 100 off the lifter heads is facilitated by the inward ramping surfaces 72, 84 and 82 (FIG. 5). The inward ramping surfaces of the lifter heads form correspondingly beveled faces 110, 112, 114 in the walls 104, 106, and 102, respectively, of the molded article. The beveled faces form a portion of the perimeter of the wall openings 22.

Still referring to FIG. 8, as the ejector pins 60 move the molded article outwardly off the lifter heads 50a, 50b, the sliding contact between the inward ramping surfaces 72, 84 of the lifter heads causes the molded article to shift transversely as indicated by arrow 116. Additionally, the molded article is removed from the mold preferably at a time when the plastic has cooled to a point at which the outer surface of the plastic has formed a resilient skin, yet the core of the plastic is still soft. At this point of cooling, the skin of the plastic is able to deflect to allow the molded article to pass the protrusions of the lifter head, yet also possesses a shape memory which causes the molded article to return to its intended shape after it has passed the lifter head protrusions. For example, for a polypropylene tank, a suitable core temperature would be approximately 275–300 degrees F., with a skin thickness of 0.015– 0.020 inch.

In addition to the transverse movement represented by arrow 116, the molded article may also move in a transverse direction angularly offset to direction 116 to allow the second protrusion 66 (FIG. 5) of lifter head 50b to disengage from wall 106. To illustrate this feature, FIG. 9 shows a fragment of a mold according to the invention having one single protrusion lifter head 50a and several double protrusion, or corner, lifter heads 50b. The release surfaces 74, 88, and 90 of all the lifter heads are oriented in a common transverse direction, indicated by arrow 120. As the molded article 100 is pushed outwardly off the lifter heads by the ejector pins, the sliding contact between inward ramping surfaces 72, 82, and 84 (FIGS. 4 and 5) of the lifter heads with the beveled surfaces 110, 112, and 114 (FIG. 8) of the wall openings causes the molded article to shift in direction 120. The release surfaces 74, 88, and 90 allow this shift to occur without interfering interengagement between the molded article and the lifter head protrusions.

It should be understood that the undercut recesses which may be formed by the molding apparatus of the invention may be holes which extend fully through the molded article, such as openings 22, or only partially through the molded article. The terms "undercuts" and "recesses" as used herein are intended to encompass all such configurations.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A molding apparatus for forming a molded article with at least one internal undercut, said molding apparatus comprising:

a male mold having at least one projection for forming the interior of the molded article, said projection defining an outward direction in which the molded article is removed from said male mold, said projection having an outwardly and transversely opening recess formed therein;

at least one lifter head movable in the outward direction between a first position in which said lifter head is received in said recess of said projection of said male mold and a second position in which said lifter head is disposed outwardly of said projection, said lifter head having a nonmovable first protrusion extending transversely to said outward direction beyond said projection when said lifter head is in said first position, said first protrusion having an inwardly directed first ramping surface;

ejector means for moving the molded article outwardly from said lifter head, said ejector means travelling parallel to said lifter head;

whereby the molded article is molded on said male mold with said lifter head in said first position and said first protrusion forming a first undercut in the molded article, whereby the molded article is moved outwardly from said projection by said lifter head moving from said first position to said second position, and whereby the molded article is removed from said lifter head by said ejector means, said removal being facilitated by said first ramping surface.

2. The molding apparatus of claim 1 wherein said first protrusion of said lifter head extends fully through said molded article such that said undercut comprises an opening.

3. The molding apparatus of claim 1 wherein said lifter head further includes a second protrusion extending transversely to said outward direction in angularly offset relation to said first protrusion and beyond said projection when said lifter head is in said first position, said second protrusion having an inwardly directed second ramping surface, said second protrusion forming a second undercut in the molded article.

4. A molding apparatus for forming a molded article with at least one internal undercut, said molding apparatus comprising:

a male mold having at least one projection for forming the interior of the molded article, said projection defining an outward direction in which the molded article is removed from said male mold, said projection having an outwardly and transversely opening recess formed therein;

ejector means for moving the molded article outwardly from said male mold;

at least one lifter head movable between a first position in which said lifter head is received in said recess of said projection of said male mold and a second position in which said lifter head is disposed outwardly of said projection, said lifter head having a first protrusion extending transversely to said outward direction beyond said projection when said lifter head is in said first position, said first protrusion having an inwardly directed first ramping surface, said lifter head further includes a second protrusion extending transversely to said outward direction and beyond said projection when said lifter head is in said first position, said second protrusion having an inwardly directed second ramping surface, said second protrusion forming a second undercut in the molded article, said first protrusion of said lifter head includes a first release surface, said second protrusion of said lifter head includes a second release surface, said first and second release surfaces both being oriented in a common direction transverse to said outward direction, whereby said first and second release surfaces allow the molded article to shift transversely off the lifter head when the molded article is removed from said lifter head by said ejector means;

whereby the molded article is molded on said male mold with said lifter head in said first position and said first protrusion forming a first undercut in the molded article, whereby the molded article is moved outwardly from said projection by said lifter head moving from said first position to said second position, and whereby the molded article is removed from said lifter head by said ejector means, said removal being facilitated by said first ramping surface.

5. An injection molding apparatus for forming a molded article, the molded article having internal walls with undercuts, said injection molding apparatus comprising:

a male mold having a plurality of outwardly directed, spaced projections and voids disposed between the projections for the formation of the internal walls of the molded article, said projections and said voids cooperatively defining an outward direction in which a molded article is removed from said male mold, at least some of said projections each having an outwardly and transversely opening lifter head recess formed therein;

ejector means for moving the molded article outwardly from said male mold;

a plurality of lifter heads each disposed in correspondence with said lifter head recess, each of said lifter heads being movable between a first position in which said lifter head is received in a said lifter head recess and a second position in which said lifter head is disposed outwardly of the projection in which the lifter head is received, each of said lifter head having a first protrusion extending transversely to said outward direction beyond the projection in which the lifter head is received and into a void, each of said first protrusions having an inwardly directed first ramping surface, at least some of said lifter heads further include a second protrusion extending transversely to said outward direction in angularly offset relation to said first protrusion and beyond the projection in which the lifter head is received and into a void, each of said second protrusions having an inwardly directed second ramping surface, said second protrusions each forming second undercuts in the internal walls of the molded article, said first and second protrusions are each formed with a release surface, all of said release surfaces being oriented in a common direction transverse to said outward direction, whereby said release surfaces allow the molded article to shift transversely off said lifter heads when the molded article is removed from said lifter heads by said ejector means;

whereby the molded article is molded on said male mold with said lifter heads in said first position and said protrusions forming first undercuts in the internal walls of the molded article, whereby the molded article is moved outwardly from said protrusions by said lifter heads moving from said first position to said second position, and whereby the molded article is removed from said lifter heads by said ejector means, said removal being facilitated by sliding contact between said undercuts and said ramping surfaces.

6. An injection molding apparatus for forming a molded article, the molded article having a plurality of internal walls disposed in intersecting relationship and forming corners therebetween, at least some of said internal walls being formed with undercuts, said injection molding apparatus comprising:

a mold base;

a male mold having a plurality of spaced projections extending outwardly from said mold base, said projections defining voids therebetween in which the internal walls of the molded article are formed, said projections and internal walls cooperatively defining an outward direction in which the molded article is removed from said male mold, a plurality of said projections each formed with an outwardly and transversely opening lifter head recess;

a plurality of lifter heads each disposed in correspondence with a said lifter head recess, each of said lifter heads being movable in the outward direction between a retracted position in which said lifter head is received in a said lifter head recess and an extended position in which said lifter head is disposed outwardly of the projection in which the lifter head is received, at least some of said lifter heads comprising corner lifter heads disposed adjacent corners formed between intersecting pairs of internal walls, each of said lifter heads having a first fixed protrusion extending transversely to said outward direction beyond the projection in which the lifter head is received and into a void, said corner lifter heads further having a second protrusion extending transversely into a void and in angularly offset relation to the first protrusion of the corner lifter head, each of said first and second protrusions having an inwardly directed ramping surface;

ejector means for moving the molded article outwardly from said lifter heads, said ejector means travelling parallel to said lifter heads;

whereby the molded article is molded on said projections with said lifter heads in said retracted position and said protrusions forming undercuts in the internal walls of the molded article, the protrusions of a corner lifter head forming undercuts in each of intersecting pairs of internal walls, whereby the molded article is moved outwardly from said projections by said lifter heads moving to said extended position, and whereby the molded article is removed from said lifter heads by said ejector means, the removal being facilitated by sliding contact between said undercuts and said ramping surfaces.

7. An injection molding apparatus for forming a molded article, the molded article having a plurality of internal walls disposed in intersecting relationship and forming corners therebetween, at least some of said internal walls being formed with undercuts, said injection molding apparatus comprising:

a mold base;

a plurality of spaced projections extending outwardly from said mold base, said projections defining voids therebetween in which the internal walls of the molded article are formed, said projections and internal walls cooperatively defining an outward direction in which the molded article is removed from said male mold, a plurality of said projections each formed with an outwardly and transversely opening lifter head recess;

ejector means for moving the molded article outwardly from said male mold;

a plurality of lifter heads each disposed in correspondence with a said lifter head recess, each of said lifter heads being movable between a retracted position in which said lifter head is received in a said lifter head recess and an extended position in which said lifter head is disposed outwardly of the projection in which the lifter head is received, at least some of said lifter heads comprising corner lifter heads disposed adjacent corners formed between intersecting pairs of internal walls, each of said lifter heads having a first protrusion extending transversely to said outward direction beyond the projection in which the lifter head is received and into a void, said corner lifter heads further having a second protrusion extending transversely into a void and in angularly offset relation to the first protrusion of the corner lifter head, each of said first and second protrusions having an inwardly directed ramping surface, each of said protrusions of each of said lifter heads is formed with a beveled release surface disposed in a common direction transverse to said outward direction, whereby said release surfaces allow the molded article to shift transversely off the lifter heads when the molded article is removed from said lifter heads by said ejector means;

whereby the molded article is molded on said projections with said lifter heads in said retracted position and said protrusions forming undercuts in the internal walls of the molded article, the protrusions of a corner lifter head forming undercuts in each of intersecting pairs of internal walls, whereby the molded article is moved outwardly from said projections by said lifter heads moving to said extended position, and whereby the molded article is removed from said lifter heads by said elector means, the removal being facilitated by sliding contact between said undercuts and said ramping surfaces.

8. A molding apparatus for forming a molded article with at least one internal undercut, said molding apparatus comprising:

a male mold having at least one projection for forming the interior of the molded article, said projection defining an outward direction in which the molded article is removed from said male mold and a transverse direction orthogonal to the outward direction, said projection having an outwardly and transversely opening recess formed therein; and at least one lifter head movable in the outward direction between a first position in which said lifter head is received in said recess of said projection of said male mold and a second position in which said lifter head is disposed outwardly of said projection, said lifter head having a fixed protrusion extending transversely to said outward direction beyond said projection when said lifter head is in said position, said protrusion having an inwardly directed ramping surface;

ejector means for moving the molded article outwardly from said lifter head, said ejector means travelling parallel to said lifter head;

whereby the molded article is molded on said male mold with said lifter head in said first position and said protrusion forming an undercut in the molded article, whereby the molded article is removed outwardly from said projection at least partially by said lifter head moving from said first position to said second position, and whereby the molded article is removed from said lifter heads by said ejector means, said removal being facilitated by said ramping surface.

9. The molding apparatus of claim 8 wherein said protrusion includes an inwardly directed first ramping surface, whereby removal of the article from said lifter head is facilitated by said ramping surface.

10. The molding apparatus of claim 8 wherein said protrusion of said lifter head extends fully through said molded article such that said undercut comprises an opening.

11. The molding apparatus of claim 8 wherein said lifter head further includes a second protrusion extending transversely to said outward direction in angularly offset relation to said first protrusion and beyond said projection when said lifter head is in said first position, said second protrusion forming a second undercut in the molded article.

12. A molding apparatus for forming a molded article with at least one internal undercut, said molding apparatus comprising:

a male mold having at least one projection for forming the interior of the molded-article, said projection defining an outward direction in which the molded article is removed from said male mold and a transverse direction orthogonal to the outward direction, said projection having an outwardly and transversely opening recess formed therein; and at least one lifter head movable between a first position in which said lifter head is received in said recess of said projection of said male mold and a second position in which said lifter head is disposed outwardly of said projection, said lifter head having a first protrusion extending transversely to said outward direction beyond said projection when said lifter head is in said position, said lifter head further including a second protrusion extending transversely to said outward direction in angularly offset relation to said first protrusion and beyond said projection when said lifter head is in said first position, said second protrusion forming a second undercut in the molded article, said first protrusion of said lifter head includes a first release surface, said second protrusion of said lifter head includes a second release surface, said first and second release surfaces both being oriented in a common direction transverse to said outward direction, whereby said first and second release surfaces allow the molded article to shift transversely off the lifter head when the molded article is removed from said lifter head by said ejector means;

whereby the molded article is molded on said male mold with said lifter head in said first position and said protrusion forming an undercut in the molded article, and whereby the molded article is removed outwardly from said projection at least partially by said lifter head moving from said first position to said second position.

13. An injection molding apparatus for forming a molded article, the molded article having internal walls with undercuts, said injection molding apparatus comprising:

a male mold having a plurality of spaced projections and voids disposed between said projections for the formation of the internal walls of the molded article, said projections and said voids cooperatively defining an outward direction in which a molded article is removed from said male mold, at least some of said projections each having a lifter head recess formed therein; and a plurality of lifter heads each disposed in correspondence with one of said lifter head recesses, each of said lifter heads being movable outwardly between a first position in which said lifter head is received in the associated said lifter head recess and a second position in which said lifter head is disposed outwardly of the projection in which said lifter head is received, each of said lifter heads having a nonmovable protrusion extending transversely to said outward direction beyond the projection in which the lifter head is received and into the adjacent void, said protrusion having an inwardly directed ramping surface;

ejector means for moving the molded article outwardly from said lifter heads, said ejector means travelling parallel to said lifter heads;

whereby the molded article is molded on said male mold with said lifter heads in said first position and said first protrusions forming first undercuts in the internal walls of the molded article, and whereby the molded article is removed outwardly from said male mold at least partially by said lifter heads moving from said first position to said second position, and whereby the molded article is removed from said lifter heads by said elector means, said removal being facilitated by said ramping surface.

14. The molding apparatus of claim 13 wherein each of said protrusions includes an inwardly directed ramping surface to facilitate removal of the article from the associated lifter head.

15. The molding apparatus of claim 13 wherein said first protrusions extend fully through the internal walls of the molded article such that said undercuts comprise openings.

16. The molding apparatus of claim 13 wherein at least some of said lifter heads each further include a second protrusion extending transversely to said outward direction in angularly offset relation to said first protrusion and beyond the projection in which the lifter head is received and into the adjacent void, said second protrusions each forming second undercuts in the internal walls of the molded article.

17. An injection molding apparatus for forming a molded article, the molded article having internal walls with undercuts, said injection molding apparatus comprising:

a male mold having a plurality of spaced projections and voids disposed between said projections for the formation of the internal walls of the molded article, said projections and said voids cooperatively defining an outward direction in which a molded article is removed from said male mold, at least some of said projections each having a lifter head recess formed therein; and a plurality of lifter heads each disposed in correspondence with one of said lifter head recesses, each of said lifter heads being movable between a first position in which said lifter head is received in the associated said lifter head recess and a second position in which said lifter head is disposed outwardly of the projection in which said lifter head is received, each of said lifter heads having a protrusion extending transversely to said outward direction beyond the projection in which the lifter head is received and into the adjacent void, at least some of said lifter heads each further include a second protrusion extending transversely to said outward direction in angularly offset relation to said first protrusion and beyond the projection in which the lifter head is received and into the adjacent void, said second protrusions each forming second undercuts in the internal walls of the molded article, said first and second protrusions on said lifter heads are each formed with a release surface, all of said release surfaces being oriented in a common direction transverse to said outward direction, whereby said release surfaces allow the molded article to shift transversely off said lifter heads when the molded article is removed from said lifter heads by said ejector means;

whereby the molded article is molded on said male mold with said lifter heads in said first position and said first protrusions forming first undercuts in the internal walls of the molded article, and whereby the molded article is removed outwardly from said male mold at least partially by said lifter heads moving from said first position to said second position.

18. The molding apparatus of claim 13 further comprising a mold base having an outwardly directed face, said projections extending outwardly from said face, and wherein said ejector means comprises a plurality of ejector pins extending through said mold base adjacent said projections.

19. The molding apparatus of claim 13 further comprising a plurality of lifter rods, each of said lifter rods disposed in correspondence with one of said lifter recesses and extending through one of said projections, each of said lifter heads affixed to a said lifter rod.

20. The molding apparatus of claim 19 further comprising a lifter plate affixed to all of said lifter rods opposite said lifter heads, said lifter plate being movable with respect to said male mold to cause said lifter heads to move between said first position and said second position.

* * * * *